United States Patent [19]

Sakai

[11] Patent Number: 5,679,203
[45] Date of Patent: Oct. 21, 1997

[54] APPARATUS FOR PEELING THE INTERLAYER OF A TWO-SIDED ADHESIVE TAPE

[75] Inventor: Hiroaki Sakai, Fukuoka, Japan

[73] Assignee: Matsushita Electric Industrial Co., Ltd., Osaka, Japan

[21] Appl. No.: 557,417

[22] Filed: Nov. 13, 1995

Related U.S. Application Data

[62] Division of Ser. No. 196,759, Feb. 15, 1994, Pat. No. 5,492,590.

[30] Foreign Application Priority Data

Feb. 15, 1993 [JP] Japan .................. 5-025073

[51] Int. Cl.⁶ .................................................. B32B 35/00
[52] U.S. Cl. .......................... 156/344; 156/249; 156/584
[58] Field of Search .................................. 156/241, 247, 156/249, 289, 344, 584; 400/696

[56] References Cited

U.S. PATENT DOCUMENTS

| | | | |
|---|---|---|---|
| 4,530,896 | 7/1985 | Christensen et al. | 430/258 X |
| 4,775,438 | 10/1988 | Funakoshi et al. | 156/249 X |
| 4,822,445 | 4/1989 | Yamaguchi | 156/584 X |
| 4,861,411 | 8/1989 | Tezyka | 156/584 X |
| 5,009,735 | 4/1991 | Ametani et al. | 156/249 X |
| 5,110,393 | 5/1992 | Sumi et al. | 156/344 |
| 5,269,865 | 12/1993 | Kushida et al. | 156/234 |
| 5,403,412 | 4/1995 | Hidaka et al. | 156/249 X |
| 5,412,925 | 5/1995 | Tani et al. | 156/344 X |
| 5,466,325 | 11/1995 | Mizuno et al. | 156/344 |

FOREIGN PATENT DOCUMENTS

| | | | |
|---|---|---|---|
| 2-221963 | 9/1990 | Japan | 430/258 |
| 3-153455 | 6/1991 | Japan . | |

*Primary Examiner*—Mark A. Osele
*Attorney, Agent, or Firm*—McDermott, Will & Emery

[57] ABSTRACT

A peeling apparatus of a separator of a two-sided adhesive tape comprises: a table for mounting and fixing an element having on a surface a two-side adhesive tape having a separator adhered on the top surface, a feeder for feeding a peeling tape having an adhesive surface, a main roller for pressing the adhesive surface of the peeling tape to the separator, thereby adhering the peeling tape to the separator, a positioner for positioning the table by relatively moving the table to the main roller, whereby the separator adhered to the peeling tape is peeled off from the two-side adhesive tape by the move of the table, and a feed reel for taking up the peeling tape. The separator peeled off from the two-side adhesive tape is taken up by the feed reel together with the peeling tape.

10 Claims, 6 Drawing Sheets

FIG. 8

APPARATUS FOR PEELING THE INTERLAYER OF A TWO-SIDED ADHESIVE TAPE

This is a divisional of application Ser. No. 08/196,759, filed Feb. 15, 1994 now U.S. Pat. 5,492,590.

BACKGROUND OF THE INVENTION

The present invention relates to an apparatus and method for peeling the interlayer, or separator, from the top surface of a two-sided adhesive tape. More specifically, the peeling apparatus of the present invention may be used to separate an interlayer from the top surface of an anisotropic conductive film where the bottom surface of the anisotropic conductive film is adhered to a panel member, for example a liquid crystal display element.

In the prior art it is known to utilize anisotropic conductive films when bonding an integrated driver circuit to the electrodes of a panel element such as a liquid crystal display. These anisotropic conductive films generally comprise two-sided adhesive tapes which have an interlayer film or separator applied on both sides, or alternately protecting at least one of the adhesive surfaces. These anisotropic conductive films are then wound on a feed reel.

For example, prior art processes for mounting an integrated driver circuit on panel element electrodes by using an anisotropic conductive film or tape having both adhesive surfaces protected by an interlayer have generally comprised the following steps:

(1) A bottom interlayer or separator on the bottom surface of the tape is peeled off, leaving the bottom surface of the anisotropic conductive film exposed;

(2) The tape is cut to a specific size;

(3) The exposed bottom surface of the sized anisotropic conductive film is adhered to an electrode on a panel element;

(4) A top interlayer or separator is peeled off from the top surface of the tape, leaving the top surface of the anisotropic conductive film exposed; and (5) The integrated driver circuit is adhered on the exposed top surface of the anisotropic conductive film.

In the prior art, the steps involving peeling the top interlayer or separator away from the anisotropic conductive film in step (4) have been performed manually due to the absence of a viable alternative procedure. Because this step is performed manually, the manufacture of devices such as described above suffers due to the lack of efficiency and precision inherent in such manual processes.

As can be readily recognized, the prior art lacks the advantages of a procedure which allows performing step (4) of peeling the interlayer away from the anisotropic film in an efficient and precise fashion. Also, the prior art fails to lend itself to any degree of automation due to the manual nature of peeling the separator from the conductive film.

The present invention solves these problems by providing an apparatus and method for efficiently and precisely peeling the separator from the top surface of the two-side adhesive tape such as anisotropic conductive film in step (4) without the use of manual labor. By avoiding the use of manual labor, it is possible to avoid the loss of time and money in the manufacture of devices which require the use of two-sided anisotropic films.

SUMMARY OF THE INVENTION

According to the present invention, am apparatus for peeling an interlayer of a two-sided adhesive tape to leave a side of the two-sided adhesive tape exposed is provided comprising: mounting and fixing means for mounting and fixing a panel element in a position exposing the interlayer of the two-sided adhesive tape; feeding means for feeding a peeling tape having an adhesive surface; contacting means for contacting the adhesive surface of the peeling tape to the interlayer of the panel member on the mounting and fixing means to adhere the peeling tape to the interlayer; positioning means for positioning the mounting and fixing means relative to the two-sided adhesive tape by moving the mounting and fixing means in proximity of the contacting means; and uptake means for taking up the peeling tape subsequent to the peeling tape being contacted with the interlayer.

A preferred embodiment of the invention comprises an apparatus for peeling an interlayer of a two-sided adhesive tape to leave an adhesive surface of the two-sided adhesive tape exposed comprising: a table which mounts and fixes a panel element in a position exposing the interlayer of the two-sided adhesive tape; a first peeling tape drive means for feeding a peeling tape having an adhesive surface; a roller which forces the adhesive surface of the peeling tape into contact and adhering to the interlayer of the panel member mounted on the table; a table drive means for positioning the table relative to the two-sided adhesive tape by moving the table into proximity with the roller; and a second peeling tape drive means for taking up the peeling tape subsequent to the peeling tape being contacted with the interlayer.

Also, according to the present invention, a method of peeling the interlayer of a two-sided adhesive tape is provided comprising a method of peeling an interlayer of a two-sided adhesive tape on an electrode of a panel element comprising: pressing an adhesive surface of a peeling tape to the end portion of the interlayer adhered on the top surface of the two-sided adhesive tape adhered on the panel element with a main roller; and moving the main roller toward the opposite end portion of the interlayer while simultaneously pressing the main roller against the adhesive surface of the peeling tape against the interlayer.

As pointed out in detail below, the present invention provides important advantages. For example, by using the present invention in place of manual labor in the manufacture of devices incorporating integrated driver circuits, it is possible to save both time and money and use robotic and other automated devices. Additionally, it is possible to introduce a level of precision and control into the manufacturing process not easily obtained by manual labor.

The invention itself, together with further objects and attendant advantages, will best be understood by reference to the following detailed description taken in conjunction with the accompanying drawings.

DESCRIPTION OF THE PREFERRED EMBODIMENTS

Figure 1:
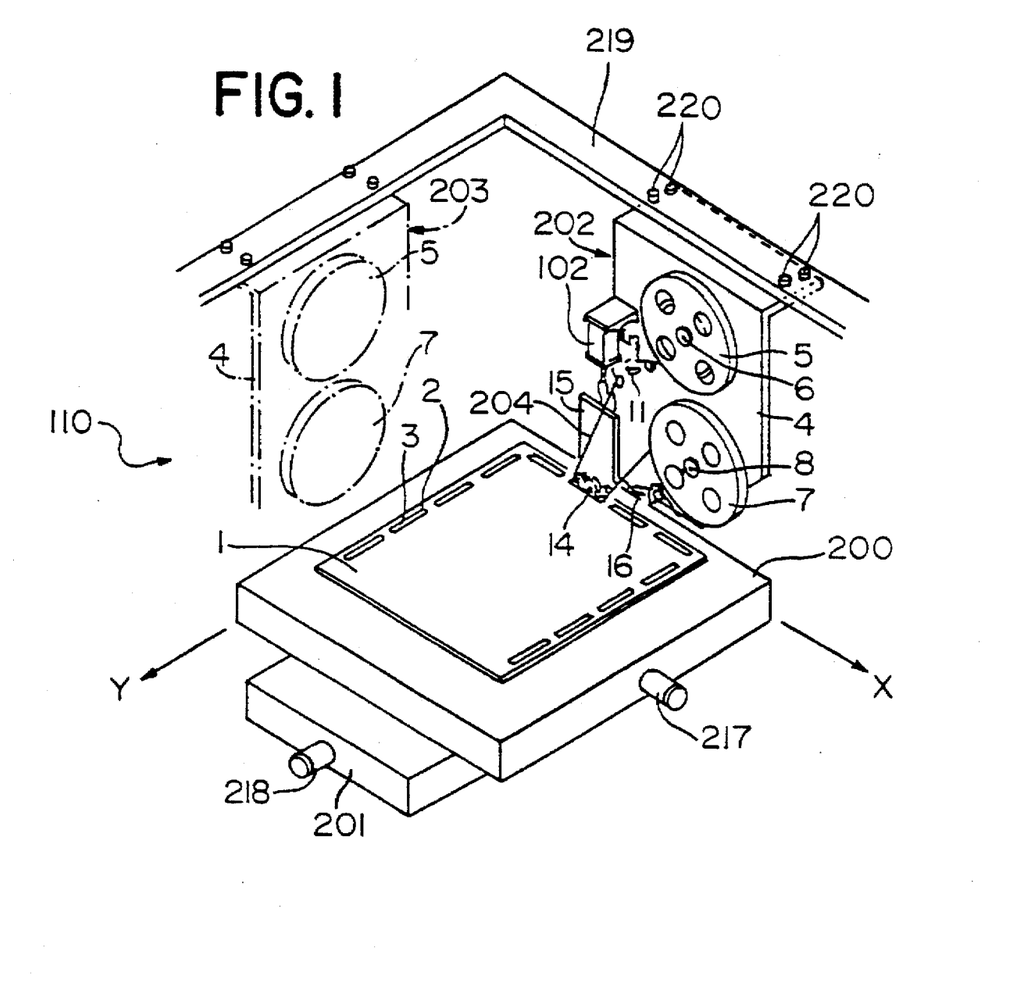
FIG. 1 is a perspective view of a peeling apparatus according to the present invention.

Turning now to the drawings, FIG. 1 illustrates a perspective view of a preferred embodiment of the peeling apparatus 110 according to the present invention. A panel element 1, for example a liquid crystal display, is mounted on a table 200, moveable in the X-direction. The table 200 is driven by a motor 217. Underneath the table 200 is a table 201, moveable in the Y-direction, which is driven by a motor 218. The panel element 1 has adhered thereon an anisotropic conductive film, or tape, 2 which includes an interlayer 3 on the top surface. The bottom surface of the anisotropic conductive film 2 or tape is adhered to an electrode (illustrated as 1a in FIG. 7) of the panel element 1. The motors 217, 218 function to move the panel member 1 in the X or Y directions, respectively, relative to the peeling units 202,203.

Situated above the tables 200,201 are a pair of peeling units 202, 203 which are identical except for their orientation with respect to the panel element 1. The peeling unit 202 is fixed on a support frame 219 by a plurality of bolts 220 and comprises a mounting member, or support plate, 4 and a feed reel 5. The feed reel 5 is mounted to the mounting member by a first shaft 6. An uptake reel 7 is mounted on a mounting member 4 via a second shaft 8. The peeling unit 202 further comprises a photoelectric sensor 11 which detects the presence of the peeling tape 204. An elevating plate 15 extends from the mounting member 4. A peeling tape 204 is wound around the feed reel 5, runs past a cylinder 102 and the photoelectric sensor 11, and over the elevating plate 15. After running over the elevating plate, the peeling tape 204 runs under a main roller 14 and to the uptake reel 7. An ionizer 16 removes static electricity from the peeling tape 204 as it runs toward the uptake reel 7.

As will be discussed below in detail, during operation of the peeling apparatus 110, the interlayer 3 is peeled away from sections from the anisotropic conductive film 2 which are positioned in the X-direction by the peeling unit 202. Similarly, the interlayer 3 on is peeled away from sections of the anisotropic conductive film 2 which are positioned in the Y-direction by the peeling unit 203.

Figure 2:
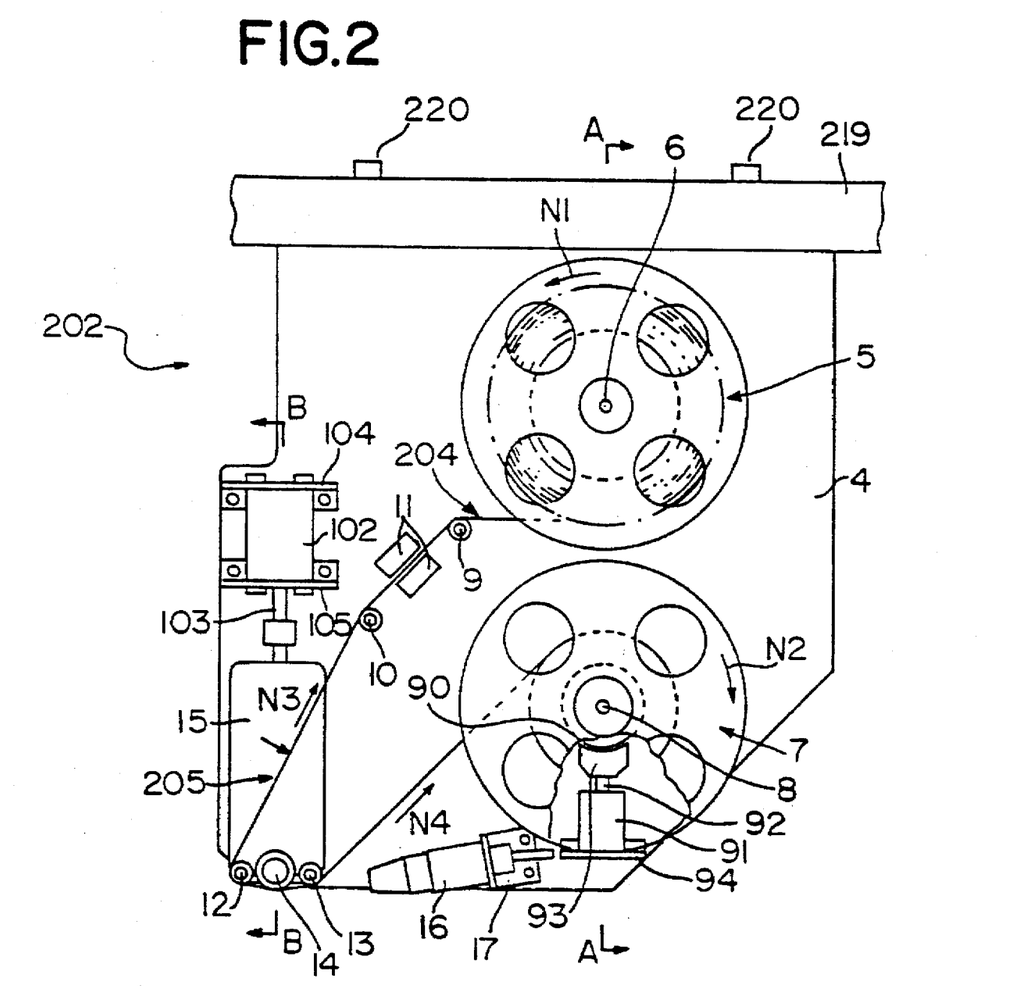
FIG. 2 is a front view of a peeling unit of a peeling apparatus according to the present invention.

Turning now to FIG. 2, a front view of the peeling unit 202 of a peeling apparatus 110 according to the present invention is illustrated. As shown in FIG. 2, the peeling unit 202 is supported by a support frame 219 via a plurality of the support bolts 220. The peeling tape 204 having an adhesive surface 205 is wound around the feed reel 5 in the clockwise direction. The feed reel 5 is rotatably attached to the mounting member 4 via the first shaft 6. The uptake reel 7 is rotatably attached to the mounting member 4 via the second shaft 8 and takes up the peeling tape 204 after running under the main roller 14. The peeling tape 2 runs from the feed reel 5 to the guide rollers 9,10 which guide the peeling tape 204 past the photoelectric sensor 11 which recognizes the presence of the peeling tape 204. The peeling tape 204 then runs over the elevating plate 15 to a subsidiary roller 12 which guides the peeling tape 204 to the main roller 14. After running under the main roller 14, the peeling tape 204 runs under a subsidiary roller 13 and to the uptake reel 7.

The main roller 14 presses the adhesive surface 205 of the peeling tape 204 against the interlayer (not shown). The main roller 14 and the subsidiary rollers 12, 13 are rotatably supported on the elevating plate 15. On the periphery of the main roller 14, an O-ring or rubber ring (not shown) is fitted in order to enhance adhesion between the adhesive surface 205 of the peeling tape 204 and the interlayer (not shown). The ionizer 16 removes the static electricity generated by friction during the peeling off of the interlayer 3 from the anisotropic conductive layer. The ionizer 16 is fixed on the mounting member 4 through a bracket 17.

As shown in FIG. 2, the cylinder 102 moves the elevating plate 15 up and down along a guide (not shown). The lower end portion of a rod 103 is coupled with the upper part of the elevating plate 15. The cylinder 102 is fixed on the mounting member 4 through a pair of brackets 104,105.

A drum 90 is fixed on the second shaft 8. A brake shoe 93 is positioned against the drum 90 and is connected to a cylinder 91 via a rod 92. The cylinder 91 is supported on the mounting member 4 via a mounting bracket 94. When the cylinder 91 is activated, the rod 92 is forced upward, likewise forcing the brake shoe 93 into the drum 90. This action brakes the rotation of the second shaft 8 by causing the brake shoe 93 at the upper end of the rod 92 to contact the drum 90.

Figure 3:
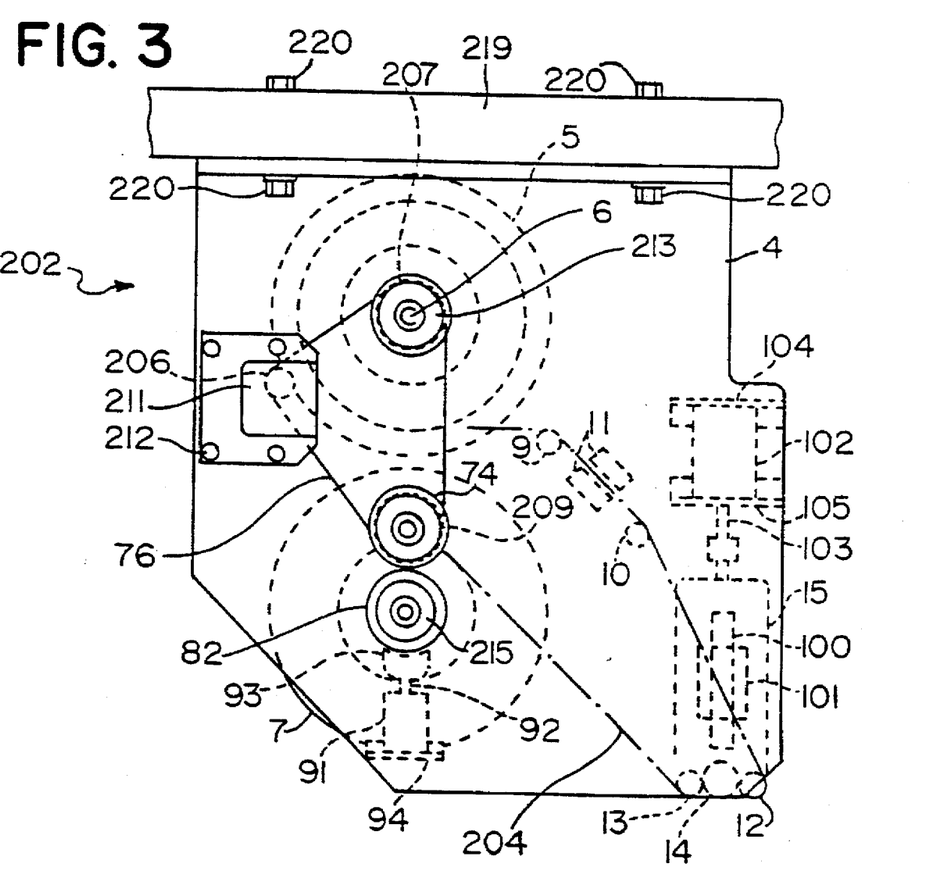
FIG. 3 is a rear view of a peeling unit of the peeling apparatus according to the present invention.

Turning to FIG. 3, a rear view of the peeling unit 202 shown in FIG. 2 is illustrated. As shown in FIG. 3, the peeling unit 202 is supported on the support frame 219 by the bolts 220. The feed reel 5 is shown rotatably mounted to the mounting member 4 by the first shaft 6. The uptake reel 7 is shown rotatably attached to the mounting member 4 by the second shaft 8. The brake shoe 93 is shown attached to the rod 92 and the cylinder 91, which is mounted to the mounting member 4 via the mounting bracket 94.

The cylinder 102 moves the elevating plate 15 up and down along a guide 100. The rod 103 is coupled with the elevating plate 15 and the cylinder 102 is fixed on the mounting member 4 through the pair of brackets 104, 105. The elevating plate 15 is slidably connected to the mounting member 4 via a slidable coupler 101.

As shown in FIG. 3, the peeling tape 204 is wound around the feed reel 5 and runs in the direction of the guide rollers 9,10. After passing a guide roller 9, the peeling tape 204 passes the photoelectric sensor 11. After passing a guide roller 10, the peeling tape 204 passes under the subsidiary roller 12, the main roller 14 and the subsidiary roller 13, and then runs to the uptake reel 7.

A first pulley 207 is rotatively coupled with the first shaft 6. A slide clutch 213 is installed between the first pulley 207 and the first shaft 6. A motor 211 is fixed to the mounting member 4 through a support member 212, and a drive pulley 206 is fixed on an output shaft (not shown). A second gear 82 is rotatably supported on the second shaft 8, and is engaged with a first gear 74. A pulley 209 is mounted on the first gear 74 and rotates together with the first gear 74. A slide clutch 215 is installed between the second gear 82 and the second shaft 8. All of the pulleys 206,207,209 are drivably connected together via a belt 76.

Figure 4:
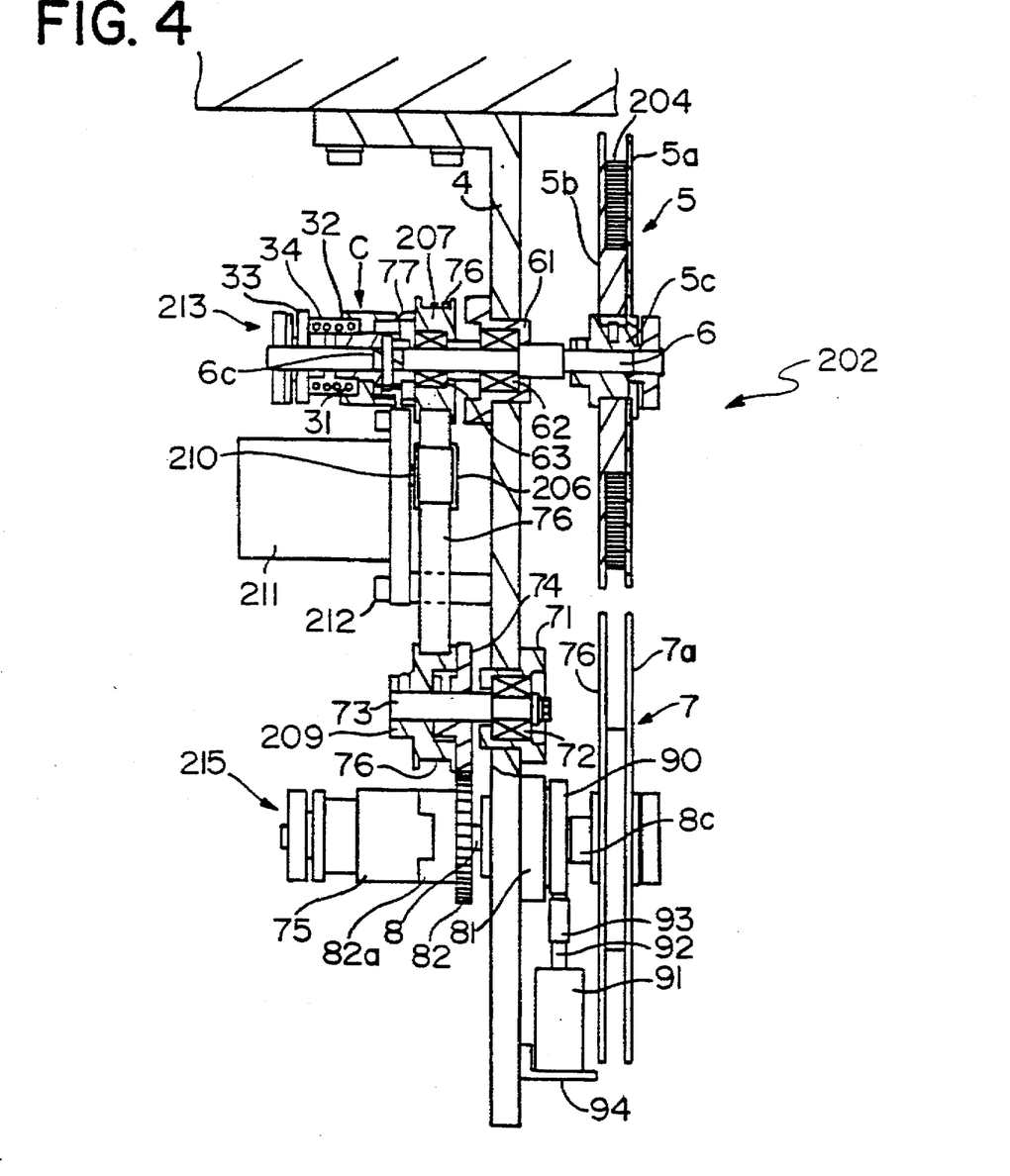
FIG. 4 is a cross-sectional view along line A—A of the peeling unit shown in FIG. 2.

Turning to FIG. 4, a cross-sectional view along line A—A of the peeling unit 202 shown in FIG. 2 is illustrated. The feed reel 5 is shown rotatably attached to the first shaft 6, and having wound therearound the peeling tape 204. The uptake reel 7 is shown rotatably attached to the second shaft 8. A holder 61 is fixed on the mounting member 4, and a bearing 62 is held inside. The first shaft 6 is rotatably supported on the mounting member 4 by the bearing 62. A reel main body 5b of the feed reel 5 is fixed on a boss 5c. A plate 5a supports the side surface of the peeling tape 204, which is wound in the reel main body 5b. The first pulley 207 is rotatively coupled with the first shaft 6 by a bearing 63, and the slide clutch 213 is installed between the first pulley 207 and the first shaft 6. The motor 211 is fixed to the mounting member 4 through the support member 212, and the drive pulley 206 is fixed on an output shaft 210.

A holder 71 is fixed on the mounting member 4, and a bearing 72 is held inside. A shaft 73 is rotatably supported on the bearing 72. The first gear 74 and the pulley 209 are fixed on the shaft 73, and rotate together with the shaft 73.

The second shaft 8, on which the uptake reel 7 is fixed, is rotatably supported by a holder 81 having a bearing (not shown) held inside. The second gear 82 is rotatably supported on the second shaft 8, and is engaged with the first gear 74. A coupling wheel 82a engaged with undulations of a flange 75 of the slide clutch 215 is extended from the second gear 82 to the left side. A boss 8c is fixed to the second shaft 8, and a reel main body 7b of the uptake reel 7 is fixed on the boss 8c. A plate 7a supports the side surface of the peeling tape 204 taken up in the reel main body 7b. The drum 90 is fixed on the second shaft 8, and the cylinder 91 brakes, when desired, the rotation of the second shaft 8 by causing the brake shoe 93 provided at the front end of the rod 92 to contact with the drum 90.

As shown in FIG. 3, the pulleys 206, 207, 209 are coupled through the belt 76. The first gear 74 and the second gear 82 are engaged with each other, and when the motor 211 is driven, the pulleys 206, 207, 209, the first gear 74, and the second gear 82 are placed together into rotation. However, since the pulley 207 and the first shaft 6, and the second gear 82 and the second shaft 8 are respectively coupled together rotatably, the torque of the motor 211 is transmitted to the first shaft 6 and second shaft 8 through the slide clutches 213, 215, respectively. The means for applying tension to the peeling tape 204 is composed of the motor 211 and the slide clutches 213, 215.

A flange 32 of the slide clutch 213 is coupled with the undulations of a coupling wheel 77 extended from the first pulley 207 to the left side. The flange 32 fits over a hub 31. The hub 31 is attached to the first shaft 6 via a pin 6c. During use of the peeling apparatus 110, to ensure that a proper torque is transmitted to the first shaft 6, the force of a spring 34 is adjusted by an adjusting nut 33. The slide clutch 215 is similar in structure to that of the slide clutch 213 described above.

Figure 5:
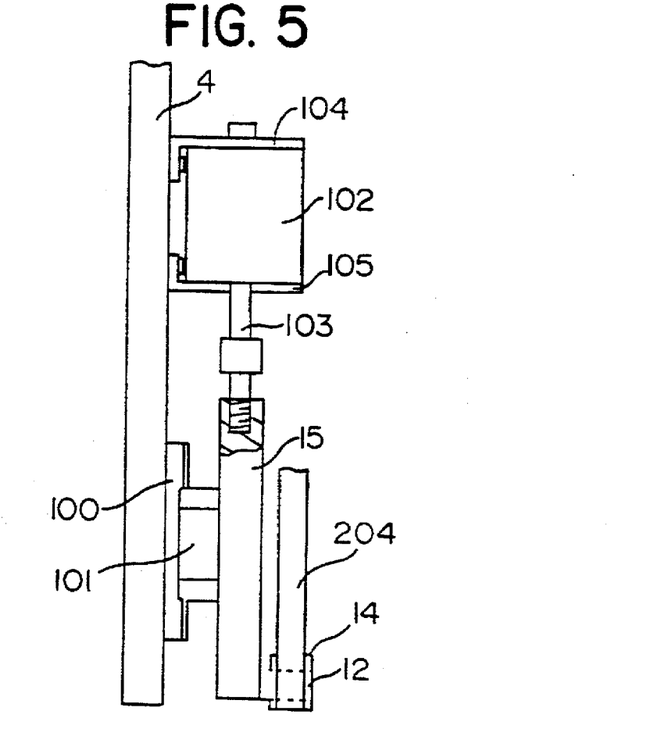
FIG. 5 is a cross-sectional view along line B—B of the peeling unit shown in FIG. 2.

Turning to FIG. 5, a cross-sectional view along line B—B of the peeling unit 202 shown in FIG. 2 is shown. The cylinder 102 is mounted to the mounting member 4 by the brackets 104, 105. The cylinder 102 is capable of applying force in the downward direction through the rod 103 to physically manipulate the elevating plate 15. The movement of the elevating plate 15 is restricted by the guide 100 and is slidably connected to the guide 100 by the slidable coupler 101. The subsidiary roller 12 and the main roller 14 are shown extending frontward from the elevating plate 15, with the peeling tape 204 running under the subsidiary roller 12 and the main roller 14.

Figure 6:
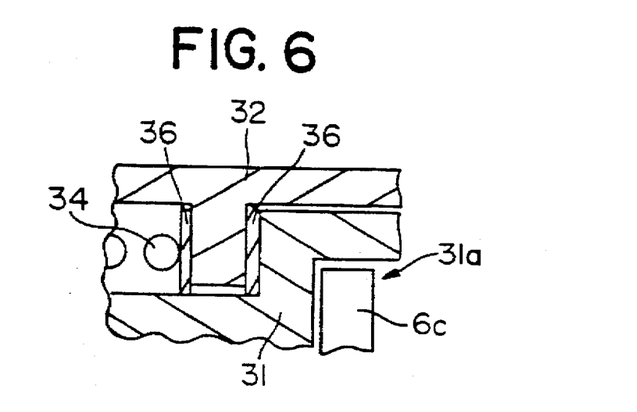
FIG. 6 is a magnified sectional view of part C in FIG. 4.

Turning to FIG. 6, a magnified sectional view of part C in FIG. 4 is shown. As shown in FIG. 6, the pin 6c inserted in the first shaft (not shown) is coupled with a groove 31a provided in the hub 31. Therefore, the first shaft (not shown) and the hub 31 rotate together. A plurality of friction plates 36 are inserted between the spring 34 and the flange 32, and the flange 32 and the hub 31. By the force of the spring 34, the friction plate 36 is pressed against the flange 32. As a result, torque from the first pulley (not shown) is transmitted through the flange 32 to the hub 31, that is, to the first shaft (not shown).

Returning to FIG. 2, the peeling tape 204 is maintained in constant tension as follows. A torque in the direction of arrow N1 is transmitted to the first shaft 6, while a torque in the direction of arrow N2 is transmitted to the second shaft 8. That is, a torque that results in the peeling tape 204 being wound around the uptake reel 7 is applied to the uptake reel 7 and the feed reel 5. Therefore, tensions in the direction of arrow N3 and arrow N4 are generated in the peeling tape 204. The gear ratio of the first gear 74 and second gear 82 is selected to make the rotating torque of the shaft 8 larger than that of the shaft 6, thus allowing the tape to run from the feed reel 5 to the uptake reel 7. To stop the peeling tape 204 from running, the brake shoe 93 is pressed against the drum 90 to prevent the uptake reel 7 from rotating.

Figure 7:
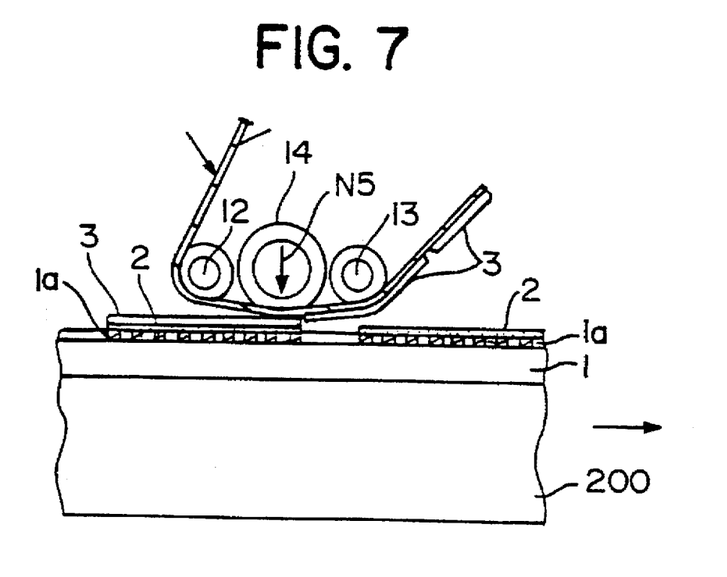
FIG. 7 is an illustration of the peeling apparatus of the present invention as the peeling unit contacts the interlayer of the anisotropic film.
Figure 8:
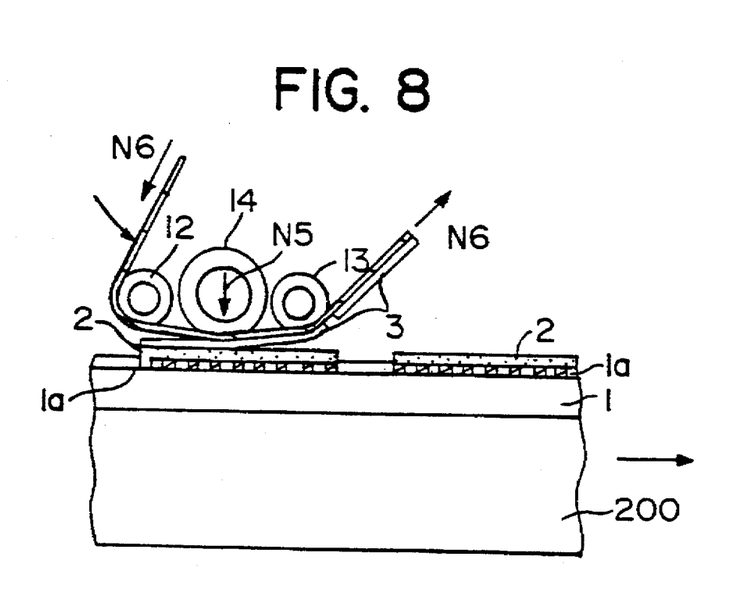
FIG. 8 is an illustration of the peeling apparatus of the present invention as the interlayer is peeled away from the anisotropic conductive film.

Turning in particular to FIGS. 7 and 8 (and generally to FIGS. 1 and 2), the operation of the peeling apparatus 110 of the invention is described. When the peeling units 202, 203 are in a waiting state, the motor (not shown) is driven with the brake shoe 93 kept in contact with the drum 90, thus maintaining a tension on the peeling tape 204. As shown in FIGS. 7 and 8, the peeling tape 204 is fed from the feed reel 5 to pass under the subsidiary roller 12, the main roller 14, and then the subsidiary roller 13. After passing under the subsidiary roller 13, the peeling tape 204 runs to the uptake reel 7. As also shown in FIGS. 7 and 8, when the peeling tape 204 is engaged to the anisotropic conductive film 2 of the panel element 1 via the movement of the elevating plate 15, the peeling tape 204 contacts the front end surface of the interlayer 3 on the anisotropic conductive film 2.

When the cylinder 102 is activated, the elevating plate 15 is moved downwardly 15. As shown in FIG. 7, the elevating plate 15 is lowered, the main roller 14 applies-pressure in the direction N5 to the peeling tape 204 so that the adhesive surface 205 of the peeling tape 204 is pressed to the right end portion of the interlayer 3. This produces an adherence between the adhesive surface 205 of the peeling tape 204 and the upper surface of the interlayer 3.

FIG. 8 depicts the action of the peeling unit as the brake is released by separating the brake shoe 93 from the drum 90. As shown in FIG. 8, the table 200 is moved in a direction parallel to the interlayer 3 in the direction toward the rear end of the cut section of the interlayer 3. As the table 200 is moved, the peeling tape 204 similarly moves. Because the adhesive force between the peeling tape 204 and the interlayer 3 is greater than the adhesive force between the interlayer 3 and the anisotropic conductive film 2, the interlayer 3 adheres to the peeling tape 204 instead of the anisotropic conductive film 2 when the table 200 moves in the X-direction. The peeling tape 204 passing beneath the main roller 14 is then pulled in the direction of arrow N6 by the torque of the uptake reel 7.

In this way, the peeling tape 204 with the adhesive surface 205 exposed is supplied from the feed reel 5, and is taken up on the uptake reel 7 with the interlayer 3 adhered to the adhesive surface 205. This results in exposing the sticky surface of the anisotropic conductive film 2 which covers, the electrode 1a. As mentioned above, the peeling apparatus 110 of this embodiment peels off the interlayer 3 and takes up the peeling tape 204 at the same time with the movement of the table 200. The ionizer 16 removes the static electricity caused by friction when peeling off the separator 3.

Similar to the above description, the peeling unit 203 removes interlayers arranged along the Y axis of FIG. 1 with the movement of the table 201 in the X-direction.

Variations on the embodiments described above are possible. For example, one alternative embodiment comprises, instead of tables 200,201 which move, the peeling units themselves move in the X and Y direction. An advantage of this embodiment is that interlayer in both the X and Y directions can easily be removed simultaneously.

As another variation, when the interlayer 3 is arranged in a straight line as shown in FIG. 1, multiple interlayers 3, only the straight line can be continuously peeled by a single operation, so that the time required for peeling process may be shortened.

As yet another variation, the separator may be adhesively secured to a surface of any element, such as when a protective cover is formed by the separator, as required. In the same manner, as described above, the separator may be removed to expose the surface of the element.

Thus, as described above, the present invention obtains the above listed advantages by providing an apparatus and method to supersede the manual step for removal of an interlayar (or separator) from an anisotropic conductive tape used to bind an integrated driver circuit to the electrode of a panel. As described, high precision of control can be readily introduced into the manufacture of such integrated driver circuits.

Of course, it should be understood that a wide range of changes and modifications can be made to the preferred embodiment described above. It is therefore intended that from the foregoing detailed description it be understood that it is the following claims, including all equivalents, which are intended to define the scope of the invention.

What is claimed is:

1. An apparatus for peeling an interlayer of a two-sided adhesive tape to leave one side of said two-sided adhesive tape exposed comprising:

a table for mounting and fixing a panel element on which the two-sided adhesive tape is adhered in a position exposing said interlayer of said two-sided adhesive tape;

feeding means for feeding a peeling tape having an adhesive surface;

contacting means for contacting said adhesive surface of said peeling tape to said interlayer to adhere said peeling tape to said interlayer;

a table driver for positioning and moving said table relative to said contacting means resulting said contacting means whereby said contacting means moves relative to the table while pressing the peeling tape onto the interlayer, uptake means that always gives a tension to the peeling tape after the contacting means passes, whereby said tension separates the peeling tape from the two-sided adhesive tape with the interlayer adhered on it and pulled into the uptake means, an ionizer disposed near the contacting means for removing static electricity generated by the two-sided adhesive tape.

2. The peeling apparatus of claim 1, wherein said two-sided adhesive tape is an anisotropic conductive film.

3. The peeling apparatus of claim 1, wherein said panel element is a liquid crystal panel.

4. The peeling apparatus of claim 1, wherein a force is applied to take up said peeling tape, said force being applied by the means for feeding the peeling tape and the means for taking up the peeling tape, thereby applying a tension to the peeling tape.

5. The peeling apparatus of claim 1, wherein when said pressing means comprises a roller which presses the adhesive surface of the peeling tape against the interlayer and said positioning means moves said panel element relative to the roller.

6. The peeling apparatus of claim 1, wherein the adhesive strength between said peeling tape and said interlayer, after contacting said peeling tape to said interlayer, is greater than the adhesive strength between said two-sided adhesive tape and said interlayer.

7. A method for peeling interlayers of a plurality of two-sided adhesive tapes adhered on a panel element forming one line, comprising the steps of:

using a roller to press an adhesive surface of a peeling tape onto one end of the interlayer on the two-sided adhesive tape positioned at the end of the line so that the peeling tape adheres to the interlayer; and (a) moving the roller toward a second end of the interlayer positioned at another end of the line while pressing and adhering the peeling tape onto the interlayers and (b) peeling the peeling tape from the two-sided adhesive tapes such that the interlayers that are adhered to the peeling tape are taken up by an uptake means.

8. The method of claim 7, wherein said two-sided adhesive tape is an anisotropic conductive film.

9. The method of claim 7, wherein said panel element is a liquid crystal panel.

10. The method of claim 7, wherein the adhesive strength between said peeling tape and said interlayer, after contacting said peeling tape to said interlayer, is greater than the adhesive strength between said two-sided adhesive tape and said interlayer.

* * * * *

UNITED STATES PATENT AND TRADEMARK OFFICE
CERTIFICATE OF CORRECTION

PATENT NO. : 5,679,203
DATED : 10/21/97
INVENTOR(S) : Hiroaki Sakai

It is certified that error appears in the above-indentified patent and that said Letters Patent is hereby corrected as shown below:

Col. 8, line 30 change "the two-sided" to --said two-sided--.

Signed and Sealed this

Twenty-eighth Day of April, 1998

Attest:

BRUCE LEHMAN

*Attesting Officer*  *Commissioner of Patents and Trademarks*